Dec. 29, 1953   R. E. PRICE ET AL   2,663,995
ROTARY FLUID MOTOR TRANSMISSION SYSTEM
Filed March 30, 1948   2 Sheets-Sheet 1

Inventors
RALPH E. PRICE
HAROLD E. BALSIGER

Attorney

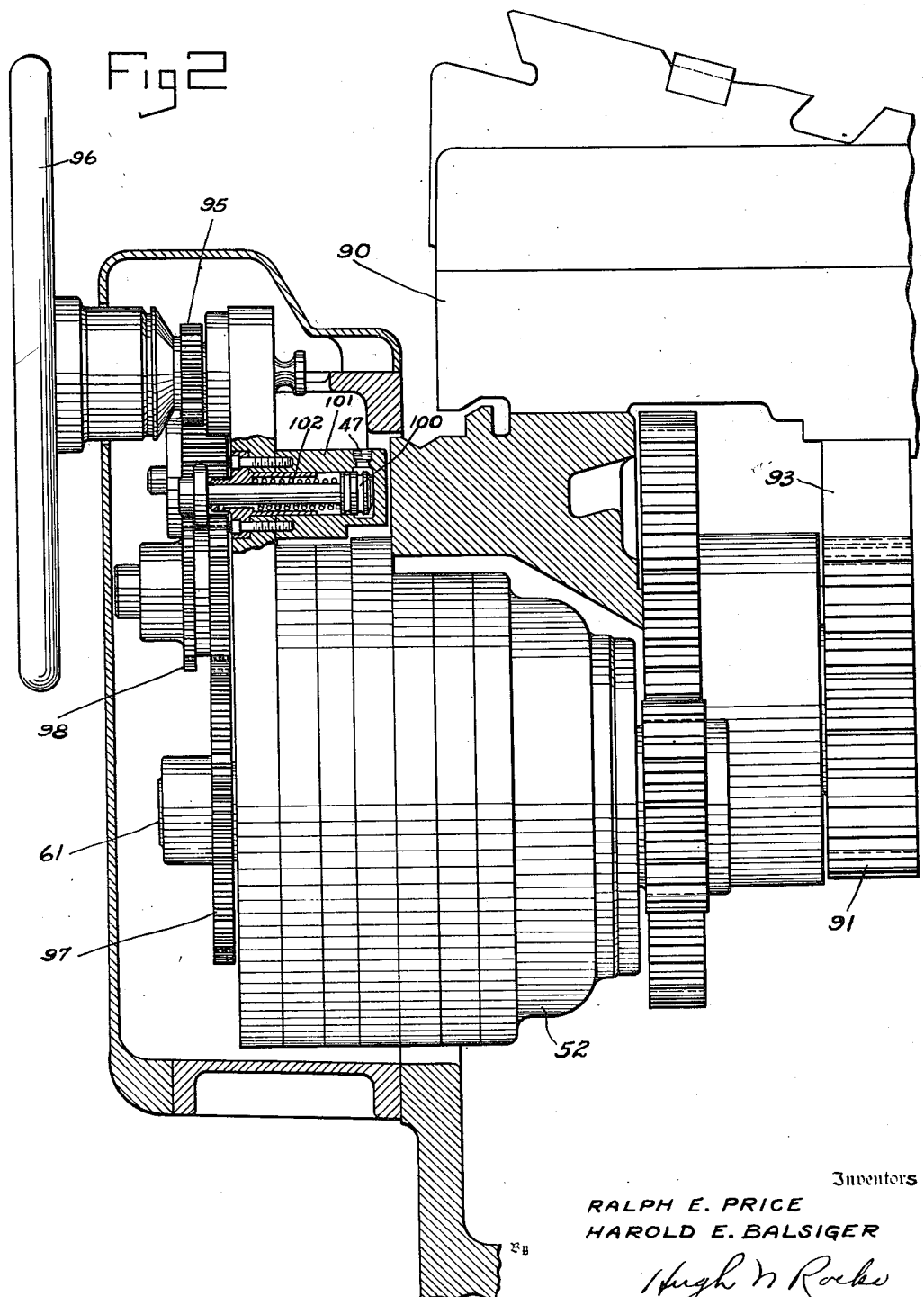

Patented Dec. 29, 1953

2,663,995

UNITED STATES PATENT OFFICE 2,663,995

ROTARY FLUID MOTOR TRANSMISSION SYSTEM

Ralph E. Price, Highfield, Md., and Harold E. Balsiger, Waynesboro, Pa., assignors to Landis Tool Company, Waynesboro, Pa.

Application March 30, 1948, Serial No. 18,044

6 Claims. (Cl. 60—53)

This invention relates to machine tools and particularly to hydraulic systems for the operation thereof.

It is an object of this invention to provide in a machine tool a hydraulic system having a single source of fluid under pressure but capable of delivering fluid under different pressures to different parts of the system.

A further object is to provide a pair of pressure operated differential valves connected in such a way as to supply fluid under predetermined pressures to different parts of the system.

A further object is to provide an improved balancing valve for maintaining a constant speed of a hydraulic motor under varying load.

A further object is to supply fluid under pressure to drive the motor only after it has been directed to shift the motor blades to working position.

Another object is to provide automatic means to shift from manual to power traverse.

Figure 2 is a partial end elevation with the means for shifting to manual traverse shown in section.

Figure 1:
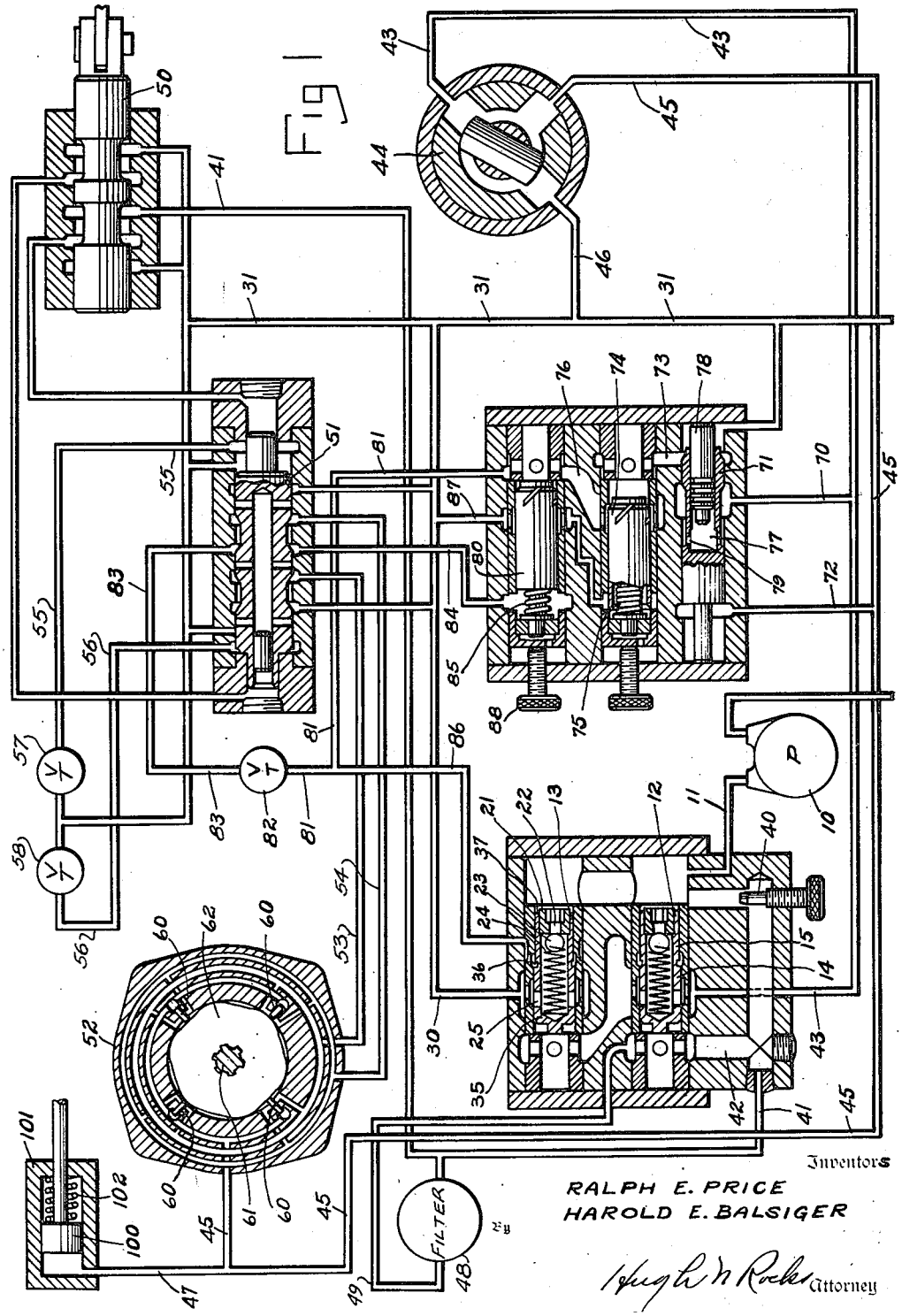
Figure 1 is a hydraulic diagram.

Numeral 10 indicates a constant volume pump for supplying fluid under pressure to the system. Line 11 connects said pump with a dual pressure operated differential valve of the type described in Patent No. 2,456,431, granted December 14, 1948. The term—differential—as used here refers to the difference in area between opposite ends of each valve.

This dual valve consists of two valve members 12 and 13. Valve 12 has two operative surfaces, a large one 14 and a small one 15. Valves 12 and 13 have an emergency relief valve built in consisting of a valve seat 21 in one end of said valve 13, a port 22 in said seat, a ball 23 and a spring 24 for holding said ball against said seat. Valves 12 and 13 are standard items and are therefore identical, although the emergency valve functions only in connection with valve 13 which has an exhaust line 30 coinciding with port 25 in said valve 13. This is all that is necessary to protect the system against an abnormally high pressure.

Valve 13 has three operative surfaces, a large surface 35, an intermediate surface 36 and a small surface 37.

The small surfaces of both valves are exposed to pump pressure. A pressure control valve 40 connects supply line 11 through line 41 with reverse pilot valve 50 which in turn directs fluid to actuate reversing valve 51 for controlling the direction of rotation of motor 52. The nature of these valves is well known and will not be described in detail. One side of a filter 48 is connected with line 41, the other side is connected thru lines 49 to valve 12.

A line 42 connects line 41 with the large end of valve 12. When valve 12 is under operating pressure it shifts to the right to connect line 42 with line 43 which conducts fluid through start and stop valve 44 and line 45 to the four blades 60 in motor 52. Said blades are thus urged by pressure and held in contact with rotor 62 on shaft 61. When valve 44 is shifted to connect line 45 with exhaust line 46 leading to exhaust line 31, pressure is removed from the blades and the fluid in the motor may be moved freely in either direction when the carriage is being traversed manually.

Motor 52 drives carriage 90 through gear 91 on the motor and rack 93 on the carriage. A manual traverse is also provided consisting essentially of pinion 95 driven by hand-wheel 96 and slidable into and out of engagement with the motor gear 97. Gear 97 is mounted on shaft 61 along with rotor 62 connected through a suitable gear train to a driving gear 91 which engages rack 93 on a carriage or slide 90.

A piston 100 in cylinder 101 serves to urge pinion 98 out of engagement with gear 97 against the action of a spring 102 when pressure is directed to motor 52. Fluid under pressure conducted through line 45 to the motor blades, also passes through branch line 47 to said cylinder. When the motor is stopped and lines 45 and 47 opened to exhaust, spring 102 returns pinion 98 into engagement with motor gear 97.

Fluid under pressure for driving motor 52 must pass through a series of valves before reaching the reversing valve 51. Reversing valve 51 is connected to motor 52 by lines 53 and 54 thru which fluid is directed alternately to opposite sides of the motor. A line 70 connects pressure supply line 43 with the first of these valves, a by-pass valve 71. In the initial or left hand position of said valve 71 said fluid can move no further. However, when start and stop valve 44 is operated to direct fluid through line 45 to motor blades 60, the pressure built up after actuating said blades is exerted through line 72 to the left hand end of valve 71 to shift said valve to the right. Fluid from line 70 is then connected to passage 73 to the right hand end of loading valve 74. The built up pressure shifts valve 74 to the left against spring 75 and thus uncovers passage 76. The purpose of valve 74 is to prevent fluid under pressure from reaching motor 52 until blades 60 have engaged rotor 62. Fluid then passes through passage 76 to balancing valve 80 and then through line 81 to speed control throttle valve 82 and line 83 to reversing valve 51.

The right hand end of valve 71 is hollowed to form a cylinder 77 which contains a piston 78. A port 79 in said valve permits the entry of fluid under pressure into said hollow portion to urge piston 78 to the right and valve 71 to the left. When valve 44 is shifted to relieve pressure on the motor blades it also relieves pressure in line 72. Fluid under pressure is always present in cylinder 77 but because of the difference in area between piston 78 and the left hand end of valve 71 the force exerted to move said valve to the left is less than that acting to move the valve to the right. Thus when line 72 is connected through valve 44 to exhaust, pressure in cylinder 77 shifts valve 71 to the left.

A line 84 connected at all times to line 83 through reversing valve 51 connects with the left hand end of balancing valve 80. Said valve 80 is urged to the right by a spring 85, the force of which determines the pressure drop across valve 82. This force may be adjusted by means of screw 88. Line 84 transmits pressure changes resulting from changes in load on the motor or adjustments of valve 82 so that pressure in line 81 may be adjusted to maintain a constant volume of fluid passing therethrough. Another line 86 connects line 81 with the intermediate area 36 of valve 13. The function of this connection is to prevent said valve 13 functioning as a relief valve so that pressure may build up sufficiently to carry an excessive starting load. However, valve 13 remains closed so long as motor 52 is running or so long as there is sufficient pressure in line 86. Valve 80 then assumes the function of a relief valve but only to the extent of maintaining a constant volume flow through valve 82 to motor 52. When under working pressure, valve 80 shifts to the left to permit the escape of a fixed volume of fluid for any given setting of throttle valve 82. The opening of the exhaust passage 87 varies with load fluctuation and speed to maintain a fixed difference in pressure between opposite sides of valve 82 for any given setting thereof.

*Operation*

Fluid under pressure is supplied to the system by pump 10 through line 11 to the small area ends of pressure operated differential valves 12 and 13. Fluid from line 11 also passes through pressure control throttle valve 40 and line 41 to pilot valve 50 which directs said fluid alternately to opposite ends of reversing valve 51.

Fluid from line 41 also passes through line 42 to the large end of valve 12. The pressure in line 41 and the reversing mechanism is substantially static, that is, flow occurs only at the instant of reversal. This pressure acting on the large end of valve 12 shifts said valve to the right to open line 43, the amount of opening depending upon the pressure, which in turn varies directly with the viscosity of the fluid. Practically the entire output of the pump passes through line 43 to start and stop valve 44. Line 70 connects line 43 with pressure operated bypass valve 71 but in the position shown, further movement of fluid is prevented. Since there is no fluid reaching valve 80, there is no pressure in line 86 nor on surface 36 of valve 13 and said valve may function as a relief valve, discharging said fluid through exhaust lines 30 and 31.

When start and stop valve 44 is shifted to connect line 43 with line 45, fluid first passes through said line to motor blades 60 to hold them in contact with rotor 62. Pressure then backs up in line 45 and through line 72 to the left end of bypass valve 71 to shift said valve to the right. In this position fluid from line 70 is directed through line 73 to the right hand end of loading valve 74. The pressure necessary to shift said valve to the left to open passage 76 is the pressure which holds blades 60 in contact with rotor 62.

As soon as the blades are under pressure, fluid can be directed to the motor 52 and valve 74 permits said fluid to pass through passage 76 to the right hand end of balancing valve 80. From valve 80 said fluid passes through line 81 to speed control valve 82 and line 83 to reversing valve 51. From valve 51 said fluid is directed alternately to opposite sides of each blade in motor 52 and thus determines the direction of rotation of rotor 62.

Spring 85 urges valve 80 to the right to prevent shifting of said valve to open exhaust passage 87. If there is no load on motor 52 or if the fluid in line 83 is at atmospheric pressure a minimum pressure determined by spring 85 is maintained in line 81 and also in line 86 to the intermediate surface of valve 13. Under any pressure above atmosphere, valve 80 will open exhaust passage 87 to permit discharge of a part of the fluid passing therethrough. Any increase or decrease in load on the motor is reflected in passage 83 and also in 84 which connects passage 83 with the left hand end of balancing valve 80. Thus an increase in motor load causes an increase in pressure at the right hand end of valve 80 and this pressure when it is sufficient to overcome the pressure of spring 85, urges said valve to the left so that an increase in pressure is required in line 81 in order to keep exhaust passage 87 open and also to maintain a fixed pressure difference between lines 81 and 83, that is, across valve 82. If the valve 82 is changed to reduce the motor speed, valve 80 must open enough to discharge the unused fluid. The effect of this arrangement is to provide sufficient pressure in the system to overcome starting resistance and thereafter to maintain any selected rate of speed of motor 52 regardless of changes in load on the motor or viscosity in the fluid. In the event, however, that said motor becomes stalled pressure will build up beyond that required for starting only to a point sufficient to open the spring and ball relief valve 24 which permits the relief of excess pressure through port 25 in said valve to exhaust passage 30.

We claim:

1. In a hydraulic system for machine tools a driven mechanism, a motor for driving said mechanism, a pump for supplying fluid under pressure to said motor, a reversing pilot valve for said motor, a reversing valve actuated by said pilot valve for directing fluid to one side or the other of said motor, a conduit connecting said pump with said pilot valve and said motor, a pressure control throttle valve in said conduit, a pressure operated regulating valve having a small area end exposed to pump pressure and a large area end exposed to the pressure in the conduit between said throttle valve and said pilot valve, a second regulating valve substantially identical with said first mentioned regulating valve, the line leading to said motor being connected to receive the discharge from said first regulating valve, a connection from said line to the large area end of said second regulating valve, the small area end of said second regulating valve also being exposed to pump pressure.

2. In a hydraulic system for machine tools or the like, a pump, a pair of differential pressure operated valves, each having a large area end and a small area end, and an intermediate area opposed to said large area, a pump connection to said small areas, a second pump connection to the large area of one of said differential valves and to a driven member, a pressure control valve in said second pump connection between said pump and the large area end of said one differential valve to determine the pressure on the small area of each differential valve, a discharge port in the large end of said first differential valve and a line therefrom to a second driven member, a line connecting said first mentioned line to the large end of said second differential valve, an exhaust port in the large end of said second differential valve, a line connecting the intermediate surface of said second differential valve with said driven member, whereby the pressure required to run said motor holds said valve in position to prevent the exhaust of fluid and thus supply a constant volume of said fluid to said motor.

3. In a hydraulic system, a supply of fluid under pressure, a hydraulic motor, connection between said fluid supply and said motor, control means for said hydraulic motor, connections between said fluid supply and said control means, said connections including a pair of pressure operated valves, each having a large area at one end thereof, a small area at the other end, and an intermediate area, the small areas of both valves being connected to the source of fluid under pressure, the large area of one of said valves also being connected to said source of fluid under pressure and having a throttle valve in said connection, said large area also having connection with said motor control means whereby to provide sufficient pressure for operation thereof, a connection from the large end of said first mentioned valve to the large end of said second valve and also to said motor whereby substantially the entire output of said source of fluid passes through said first mentioned valve, said second valve having an exhaust line near the large area end and a connection from said motor to said intermediate area whereby to change the pressure in the first mentioned line to said motor so as to maintain a constant flow of fluid to said motor and a constant speed of said motor regardless of load.

4. In a hydraulic system, a hydraulic motor, a supply of fluid under pressure connected to said motor including a pump, a flow control valve in said line between said pump and said motor, connections between said flow control valve and said motor for actuating said valve to maintain a constant flow of fluid under pressure to said motor regardless of the load thereon, other hydraulically operated devices in said system and means for maintaining a minimum pressure on said devices unaffected by the change in load on said motor comprising a pressure operated relief valve in the line between said pump and said devices, connections between said relief valve and said constant flow valve whereby the discharge from said relief valve serves as a supply of fluid under pressure for said motor.

5. In a hydraulic system, a source of fluid under pressure comprising a pump, a motor having a housing, a rotor rotatably mounted therein, peripherally spaced blades slidably mounted in one of said members for movement in a substantially radial direction, connections between said pump and said blades for supplying fluid for urging them into engagement with the other of said members, connection between said pump and said rotor for directing fluid under pressure for effecting rotation thereof, a pressure operated valve in said first mentioned connection operable in response to a predetermined pressure on said blades for permitting the passage of fluid through said second connection for effecting said rotation of said rotor.

6. In a hydraulic system, a source of fluid under pressure comprising a pump, a motor having a housing, a rotor rotatably mounted therein, peripherally spaced blades slidably mounted in one of said members for movement in a substantially radial direction, connections between said pump and said blades for supplying fluid for urging them into engagement with the other of said members, connection between said pump and said rotor for directing fluid under pressure for effecting rotation thereof, including a series of pressure operated valves operable in response to a predetermined pressure on said blades to direct fluid under pressure to effect said rotation of said rotor.

RALPH E. PRICE.
HAROLD E. BALSIGER.

References Cited in the file of this patent

UNITED STATES PATENTS

| Number | Name | Date |
|---|---|---|
| 446,799 | Thorpe | Feb. 17, 1891 |
| 678,338 | Harger | July 9, 1901 |
| 890,793 | Pfeiffer | June 16, 1908 |
| 1,845,232 | Brandenburg | Feb. 16, 1932 |
| 2,102,865 | Vickers | Dec. 21, 1937 |
| 2,234,009 | Robinson | Mar. 4, 1941 |
| 2,238,061 | Kendrick | Apr. 15, 1941 |
| 2,255,783 | Kendrick | Sept. 16, 1941 |
| 2,284,228 | Page | May 26, 1942 |
| 2,352,140 | Trott | June 20, 1944 |
| 2,354,634 | Griswold | July 25, 1944 |
| 2,453,785 | Cousino | Nov. 16, 1948 |
| 2,456,431 | Price | Dec. 14, 1948 |
| 2,570,351 | Klessig | Oct. 9, 1951 |